United States Patent [19]
CoChimin

[11] Patent Number: 5,877,576
[45] Date of Patent: Mar. 2, 1999

[54] STATOR FRAME FOR DYNAMOELECTRIC MACHINE AND METHOD FOR MAKING SAME

[75] Inventor: Jimmy CoChimin, Fort Wayne, Ind.

[73] Assignee: General Electric Company, Fort Wayne, Ind.

[21] Appl. No.: 790,845

[22] Filed: Jan. 30, 1997

Related U.S. Application Data

[62] Division of Ser. No. 291,834, Aug. 17, 1994, Pat. No. 5,630,461, which is a continuation of Ser. No. 834,684, Feb. 11, 1992, abandoned.

[51] Int. Cl.⁶ .................. H02K 1/12; H02K 1/32
[52] U.S. Cl. .................. 310/254; 310/89; 310/42; 310/258; 310/64; 363/141; 363/145
[58] Field of Search .................. 310/64, 680, 89, 310/91, 254, 258, 259, 42; 363/141, 151, 145

[56] References Cited

U.S. PATENT DOCUMENTS

| | | | |
|---|---|---|---|
| 3,047,754 | 7/1962 | Jaeschke | 310/105 |
| 3,707,037 | 12/1972 | Gutris | 29/596 |
| 3,889,737 | 6/1975 | Olsen | 164/34 |
| 3,916,231 | 10/1975 | Cathey | 310/62 |
| 4,103,192 | 7/1978 | Wendt et al. | 310/64 |
| 4,105,905 | 8/1978 | Barcus | 310/59 |
| 4,415,824 | 11/1983 | Meier | 310/89 |
| 4,448,235 | 5/1984 | Bishop | 164/34 |
| 4,465,946 | 8/1984 | Springer | 310/42 |
| 4,657,063 | 4/1987 | Morris | 164/45 |
| 4,706,732 | 11/1987 | Ruhlandt et al. | 164/353 |
| 4,742,257 | 5/1988 | Carpenter | 310/62 |
| 4,766,942 | 8/1988 | Wessman | 164/34 |
| 4,785,870 | 11/1988 | Snook | 164/34 |
| 4,786,833 | 11/1988 | Knobel | 310/89 |
| 4,802,447 | 2/1989 | Corbett | 123/65 K |
| 4,839,547 | 6/1989 | Lordo et al. | 310/60 A |
| 4,859,889 | 8/1989 | Andrews et al. | 310/89 |
| 4,880,047 | 11/1989 | VanRens | 164/45 |
| 4,883,110 | 11/1989 | Morgan et al. | 164/249 |
| 4,884,622 | 12/1989 | Jougulet | 164/45 |
| 5,008,575 | 4/1991 | Ishimoto et al. | 310/89 |
| 5,391,837 | 2/1995 | Carey | 174/50 |
| 5,630,461 | 5/1997 | Cochimin | 164/34 |

FOREIGN PATENT DOCUMENTS

| | | |
|---|---|---|
| 380357 | 5/1986 | Australia . |
| 004821 | 9/1981 | European Pat. Off. . |
| 0190602 | 1/1985 | European Pat. Off. . |
| 1003844 | 9/1953 | Germany . |
| 7129403 | 4/1972 | Germany . |
| 3710048 | 3/1987 | Germany . |
| 8913364 | 2/1990 | Germany . |
| 61-15544 | 1/1986 | Japan . |
| 62-15124 | 6/1987 | Japan . |
| 63-87143 | 4/1988 | Japan . |
| 1248957 | 12/1968 | United Kingdom . |

OTHER PUBLICATIONS

*Giesserei*, vol. 74, No. 1, Jan. '97, pp. 4–12.
*Foundry Management & Technology*, Apr. 1988, four page article entitled "Robinson Foundry Automates Lost Iron Casting" and a singe advertisement of Robinson Foundry, Inc.
*Machine Design*, vol. 62, No. 17, Aug. 23, 1990, pp. 134–138.

*Primary Examiner*—Nestor Ramirez
*Assistant Examiner*—Michael Wallace, Jr.
*Attorney, Agent, or Firm*—Wayne O. Traynham

[57] ABSTRACT

A dynamoelectric machine having a stator housing or frame made by a lost foam process utilizing a unitary single-piece vaporizable pattern. The stator housing may be made from a molten metal such as cast iron or aluminum, and has an annular wall having integral outwardly extending longitudinal cooling fins, mounting foots pads and a conduit box support pad. The lost foam process enables the cooling fins to have a greater effective cooling fin height to housing diameter ratio and greater effective cooling fin height to housing annular wall thickness ratio than obtained with prior sand casting processes. The greater height fins provide increased strength and rigidity for the annular wall which can be made radially thinner than prior stator housing or frames of similar size. Substantial savings in material and labor are realized by the stator housing.

30 Claims, 5 Drawing Sheets

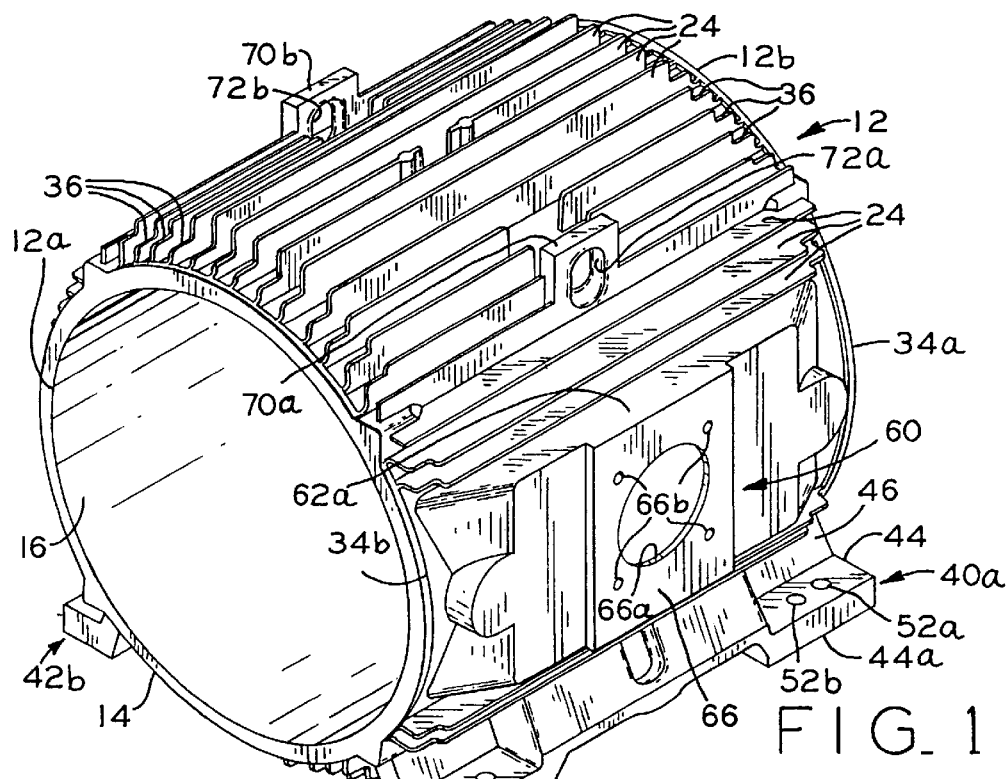
FIG_1
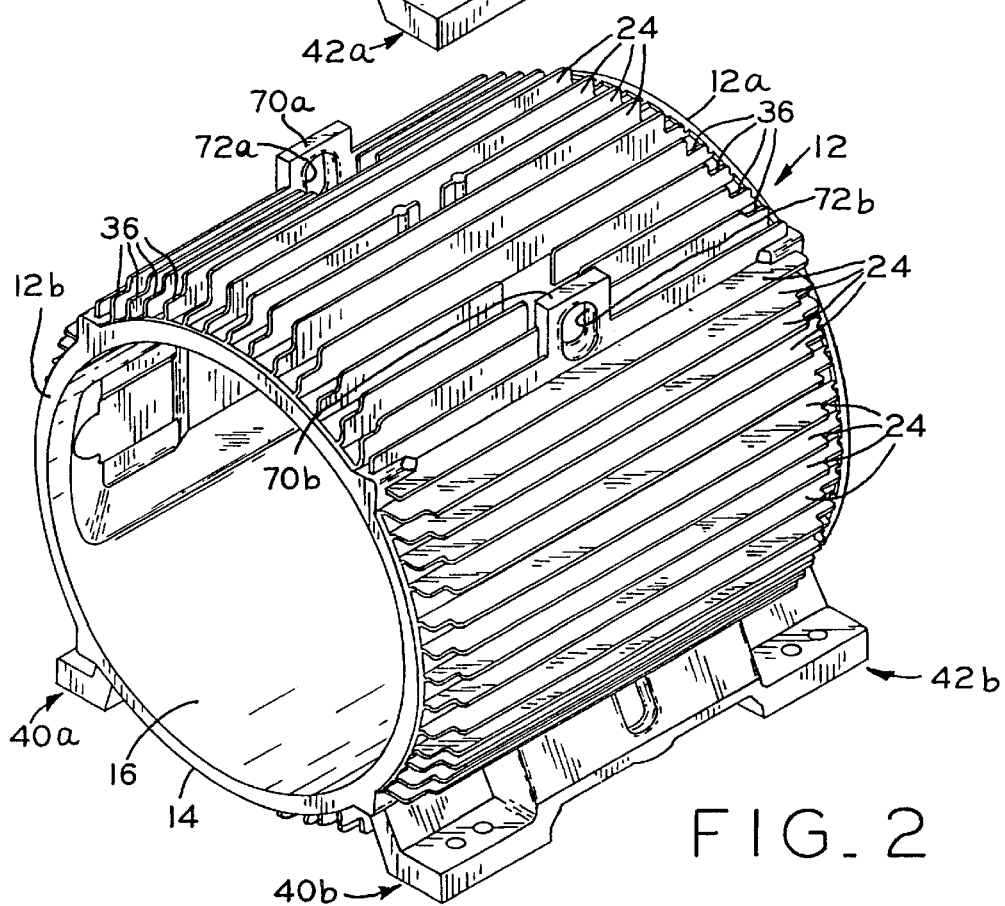
FIG_2

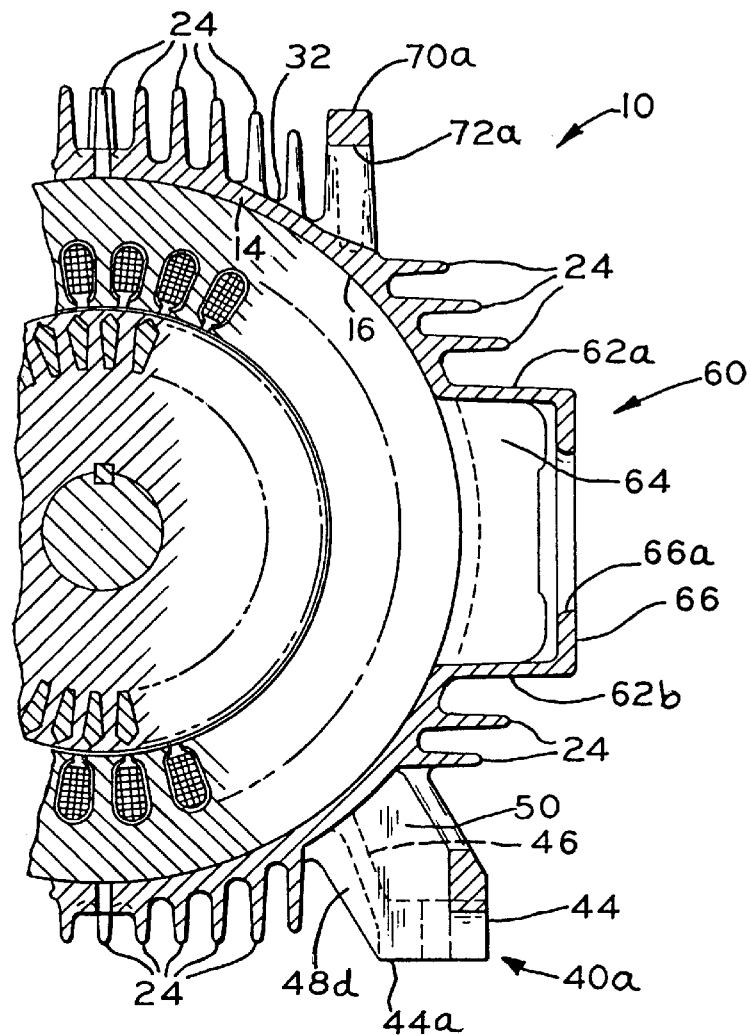
FIG_6
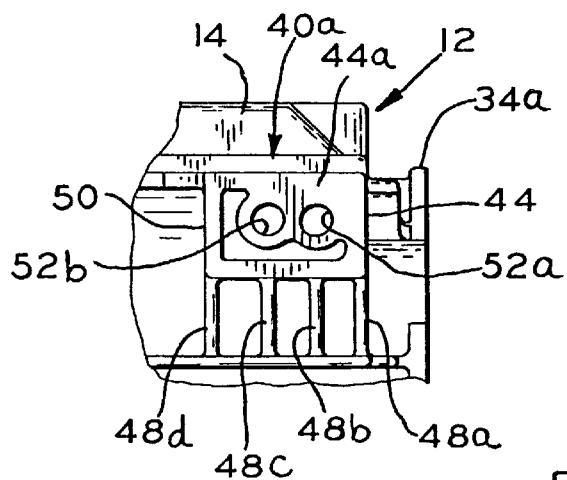
FIG_7

5,877,576

STATOR FRAME FOR DYNAMOELECTRIC MACHINE AND METHOD FOR MAKING SAME

This is a division, of application Ser. No. 08/291,834, filed Aug. 17, 1994, now U.S. Pat. No. 5,630,461 which is a continuation from Ser. No. 834,684, filed Feb. 11, 1992, abandoned.

BACKGROUND OF THE INVENTION

The present invention relates generally to stator housings or frames for dynamoelectric machines, and more particularly to new and improved stator frames and methods of making same.

It is conventional in the design of many types of dynamoelectric machines, such as electric motors and generators, to support a stator core within a stator housing or frame. The stator housing or frame may have external support feet or pads which facilitate mounting on a suitable support or apparatus such as a machine tool in a predetermined orientation, and defines a cavity to receive a stator core. Suitable bearings and support structure are also provided to rotatably support a rotor in coaxial relation within a bore in the stator core. In motors and generators it is a common practice to provide generally longitudinal fins on the external surface of the stator housing or frame which enhance cooling by means of air passing over or around the fins during operation.

In general, cast stator frames, housings or shells of prior dynamoelectric machines have been made of cast iron by sand casting processes. The sand casting process generally entails burying a pattern with packed sand defining at least one parting plane, removing the pattern to form a mold cavity, positioning a separate core piece within the mold cavity to define the stator core accommodating cavity of the stator frame, positioning separate pieces that will define mounting feet or pads on the casting and, if desired, one or more conduit box support pads to finalize the mold cavity. Molten iron is then poured into the mold cavity. After solidifying and cooling, the casting is removed and cleaned, leaving a relatively rough surface casting. This process is very time consuming, generally taking several hours from start to finish.

A significant drawback in making stator housings by such sand casting processes is that the sand-cast stator housing must undergo substantial machining. For example, a common technique for mounting an annular stator core within the stator housing cavity is to cold-press the stator core into the bore. In this procedure, the as-cast interior of the housing generally requires significant machining to bring the dimensional configuration thereof to a proper size and tolerance range. An alternative procedure for mounting stator cores within stator housings is by known heat shrink techniques. In this procedure, the wall thickness of the stator frame must be relatively precisely machined to have uniform thickness walls to insure uniform and low stress shrinkage after heating the housing to receive the stator core. Sand-cast stator housings thus generally require substantial machining to prepare the as-cast housing for assembly with a stator core by heat shrink methods. Moreover, the heat shrink process generally takes two to three hours to complete. Also, the opposite end surfaces on the stator housing generally require significant machining to prepare them for mating relation with rotor shaft bearing support frames, commonly also referred to as end shields. Additional machining may be necessary when a cooling fan cover or shroud is to be supported on one end of the stator housing for directing fan-driven air over the cooling fins.

Thus, conventional sand-cast stator frames are associated with expensive and labor intensive machining operations and generally result in significant material waste, all of which adds to their cost of manufacture.

Another very significant drawback with sand-cast stator housings or shells is that a sand mold imposes substantial limitations on the stator housing design. For example, in larger size motors and generators where heat transfer, i.e. cooling, is a particularly important factor, sand casting characteristics limit the relative height and thickness dimensions of the cooling fins formed on the external surface of the stator housing. More specifically, the rough sand surfaces defining the fin cavities create a relatively high friction interface with the poured molten metal, causing the molten metal to flow slowly at the interface with the sand. If the fin height to fin thickness ratio is relatively high, as desired to obtain optimum cooling, the molten metal may solidify before it completely fills the fin cavity, thereby resulting in an incomplete fin or a non-uniform fin surface, either of which may result in a defective casting. Further, casting material has a tendency to crack and break the sand mold before the molten metal reaches the full depth of the fin cavities. This phenomenon results in disadvantages that practice of the present invention overcomes.

In an attempt to overcome the drawbacks associated with sand cast stator housings, alternative techniques have included consideration of making stator housings by lost foam casting processes. This type of technique or process, which may also be termed evaporative pattern or evaporative foam casting, generally entails making one or more metallic tools or intermediate molds which define a cavity substantially equal to the finished cast product desired, or a portion of the finished product. The intermediate mold cavity is filled with small polystyrene plastic beads, and high temperature steam is injected into the plastic beads to fuse them together. This creates a vaporizable polymeric pattern which, after removal from the tool or mold, has a configuration substantially identical to the corresponding final product casting desired. The pattern is then given a thin vapor-permeable film or coating.

The coated vaporizable pattern thus produced, together with suitable sprue and gate pieces which may also be made of a coated vaporizable polymeric material, are then buried in a sand container which may be vibrated to pack the sand about the pattern, sprue and gate pieces. As molten metal, such as grey iron or aluminum, is poured into the pattern, the polystyrene pattern vaporizes and is replaced by the molten metal. After solidification and cooling, the resulting casting is removed from the sand. In general, the lost foam process results in a casting having substantially improved dimensional accuracy, stability and surface finish over products of sand casting processes.

One attempt at making grey iron stator frames or shells by the lost foam casting process has been undertaken in the prior art by at least one foundry. The vaporizable patterns used by such foundry in making grey iron stator frames are made in two separate pieces or sections which are secured together, as by a suitable adhesive, to form a completed pattern. It is believed that this approach, however, has drawbacks in that the parting line or parting planes of the pattern (that is, the interfacing adhered surfaces) prevent the pattern from having the degree of dimensional accuracy that would be necessary to fully realize the benefits otherwise achievable with lost foam casting. Another drawback in the stator frames made by the known prior techniques using a lost foam process is that the external longitudinal cooling fins on the stator frames appear to be of equal or reduced height in comparison to the fin height of comparable size stator frames made by conventional sand casting techniques. Also, it is believed that the number of external cooling fins for a given diameter stator frame has been reduced on prior lost foam stator frames as compared to comparably sized sand cast stator frames, thereby resulting in increased circumferential spacing between fins on the lost foam stator frame.

The prior techniques and drawbacks described above appear to represent conventional thinking of persons skilled in the art. For example, when tool makers were approached by applicant to make tools or molds for making vaporizable patterns lost foam stator housing castings having external cooling fins, the conventional approach seemed to represent a bias toward making the final product configuration such that it would be easier and less costly to produce the vaporizable patterns from the tools or molds. More particularly, it is apparently believed that reducing the height and number of cooling fins on a motor stator housing makes it much easier and less expensive to make the metallic tools or molds, and to remove the vaporizable patterns from the tools. Thus, efforts to increase the number of fins (and length or height thereof) would appear to be contrary to conventional wisdom in the art, although fewer and shorter height fins would certainly seem to make it easier to remove a pattern from the tool. It thus seems that prior decisions relating to making castings to be used for motor housings have been driven by casting process artisans. However, it is believed that it would be more desirable to identify desirable criteria for the functional performance of a finished cast motor housing, and then refine or improve casting techniques to provide finished housings having such characteristics. Such characteristics are related to, among other things, the overall strength and rigidity of the fins and stator housing; the total amount of material needed to maintain a desired degree of structural integrity; heat transfer qualities of a finished housing; the amount of post casting machining that will be required; and the type of process to be used for assembling the stator and housing.

Practice of the present invention clearly contemplates increasing fin height to add strength and rigidity to the stator housing. The latter is particularly desirable to allow an increase in the rigidity of the generally annular wall which immediately surrounds the stator core, and enables the use of a thinner annular wall. The thickness of this annular wall significantly affects the heat transfer and cooling characteristics of the stator frame, and thus improved heat transfer characteristics as well as structural characteristics and material utilization are achieved.

SUMMARY OF THE INVENTION

A general object of the present invention is to provide a new and improved dynamoelectric machine having a novel stator housing and a method for making the stator housing.

A more particular object of the present invention is to provide a novel stator housing made by a lost foam casting process wherein the stator housing has improved strength and structural integrity, and thermal characteristics, over prior sand cast and lost foam cast stator housings.

Another object of the present invention is to provide a novel stator housing made in accordance with a lost foam process wherein the stator housing has longitudinal cooling fins having increased ratio of effective cooling fin height to housing diameter; and an increased ratio of fin height to annular housing wall thickness when compared to prior stator housings made in accordance with either sand casting or prior lost foam processes; and preferably without reducing the spacing between cooling fins.

A further object of the present invention is to provide a novel stator housing for use with dynamoelectric machines and a method of making the stator housing by a lost foam process, wherein the stator housing requires substantially reduced machining and thereby has both reduced material waste and reduced machining costs as compared to sand cast stator housings, and is characterized by improved strength and structural integrity, and heat transfer characteristics, while using less material than required for prior sand cast stator housings of comparable motor horsepower ratings.

A still further object of the present invention is to provide a new and improved motor having a stator housing made by a lost foam process, and wherein the housing has improved structural and thermal characteristics so that desirable transfer of heat from the motor is dissipated readily from the housing, and so that less material is used in the overall manufacture of such motor.

One feature of stator housings made in accordance with the present invention lies in their ability to be manufactured by a lost foam process which, in addition to providing economic savings through reduced machining and material waste, is substantially less labor intensive, thereby resulting in further cost savings.

Another feature of stator housings made in accordance with the present invention lies in the ability to manufacture the stator housings by a lost foam process which provides significant economic advantages and improved heat transfer characteristics by enabling a greater ratio of effective cooling fin height to diameter than heretofore obtainable, while also increasing the strength and structural integrity of the stator housings.

Another feature of a preferred form of stator housing and a preferred lost foam method of making the housing in accordance with the present invention lies in the ability to make the stator housing from iron or aluminum with the resulting stator frame being substantially similar in appearance when either of the two materials is used.

Further objects, features and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a perspective view of a stator housing constructed in accordance with the present invention for use with dynamoelectric machines;

FIG. 2 is a perspective view of the stator housing of FIG. 1 but viewed from the opposite side from FIG. 1;

FIG. 6 is a fragmentary transverse sectional view taken substantially along line 6—6 of FIG. 4, but having portions of a rotor and stator core mounted within the stator housing cavity;

FIG. 7 is a bottom view of a mounting foot pad taken generally along line 7—7 of FIG. 4.

DETAILED DESCRIPTION

Figure 8:
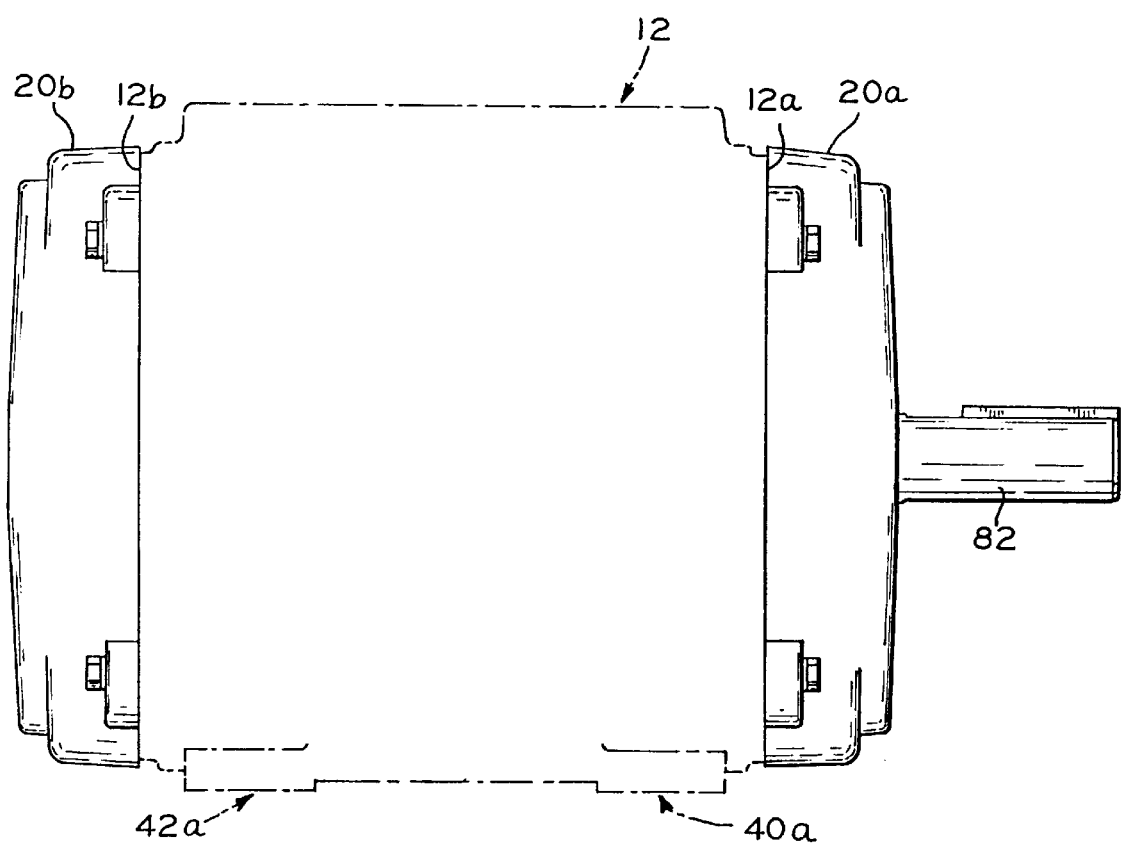
FIG. 8 is a side elevational view of a dynamoelectric machine employing a stator housing in accordance with the present invention, shown in phantom, and having other parts of a completed motor, including end frames and a rotor shaft.

Referring now to the drawings, a dynamoelectric machine constructed in accordance with the present invention is illustrated in outline form and indicated generally at 10 in FIG. 8. As used herein, the term dynamoelectric machine is meant to cover any electromechanical apparatus or machine which employs a stator housing, such as electric motors and generators. The dynamoelectric machine 10 includes a stator housing or frame 12 which, as illustrated in FIGS. 1, 2 and 4–6, has a substantially annular wall 14 defining an axial cylindrical bore or cavity 16 of generally uniform diameter adapted to receive a stator core assembly 18, as shown in FIG. 6. The axial bore 16 intersects opposite ends 12a and 12b of the housing 12 which also define annular end surfaces on the wall 14 and lie in planes substantially transverse to the longitudinal axis of bore 16.

As will be described, the stator housing or frame 12 is made by a lost foam casting process using an evaporative pattern which has a configuration substantially identical to the stator housing so that minimal machining is required to prepare the stator housing to receive a stator core of the stator assembly 18, and end frames or end shields with associated rotor shaft bearings, as indicated at 20a and 20b in FIG. 8. The lost foam casting process enables the stator housing 12 to be cast from molten iron or aluminum with close dimensional tolerances required for assembly with a stator core and end frames or the like without substantial machining, thus leading to significantly reduced material waste with attendant cost savings in both material and labor.

Figure 4:
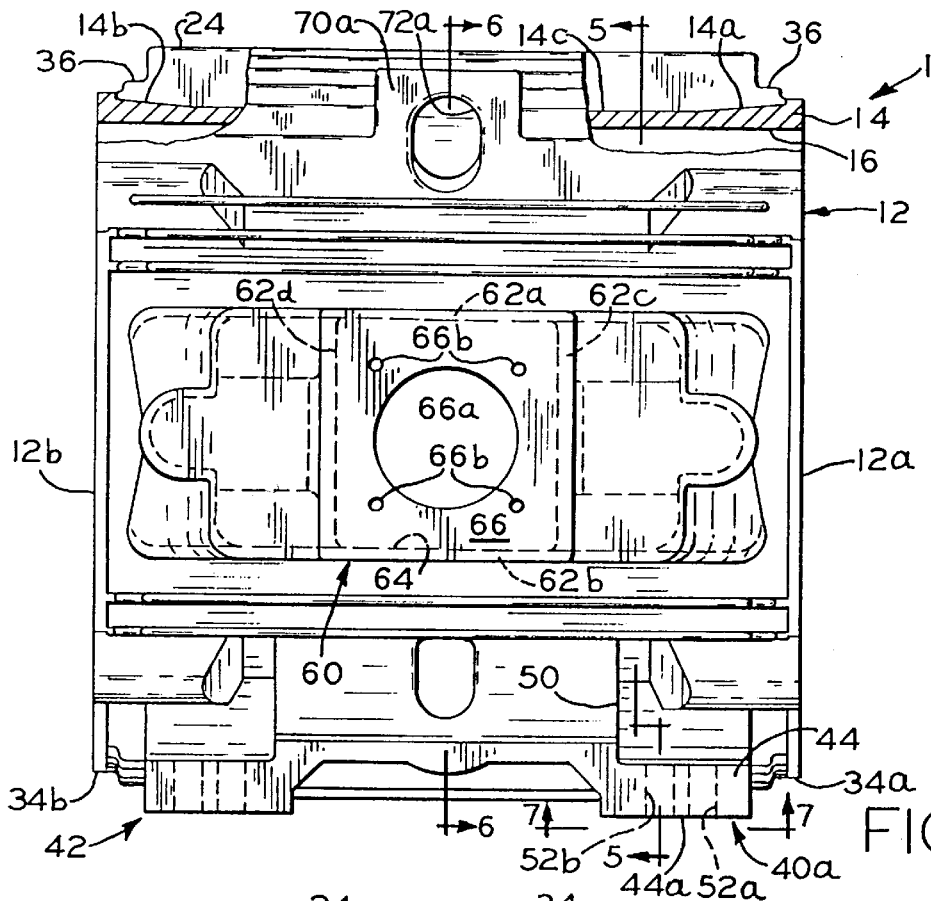
FIG. 4 is side elevational view of the stator housing of FIG. 1 but with portions broken away for purposes of clarity.

The annular wall 14 of the stator housing 12 is of generally uniform radial thickness along a major portion of its length. As illustrated in FIG. 4, the annular wall 14 is formed so as to have increased radial thickness at its opposite ends in the form of outwardly tapered or frustoconical external surfaces 14a and 14b. For a stator housing 12 having a nominal length of approximately seventeen inches and having a nominal axial bore diameter of approximately fifteen inches, the outwardly tapered end surfaces 14a and 14b extend from the opposite end surfaces 12a and 12b, longitudinally along the length of the housing a distance of approximately two inches at which point the tapered surfaces 14a and 14b merge with a smaller diameter outer surface 14c formed along an annular wall section of the annular wall 14 intermediate the outwardly tapered end surfaces 14a and 14b. For purposes of description, the wall 14 and its outer end surfaces 14a and 14b and intermediate length surface 14c are described as annular even though, as will be described, the wall 14 has external longitudinal cooling fins formed integral therewith. With the axial bore 16 of the stator frame housing 12 having a nominal diameter of approximately fifteen inches, the radial thickness of the intermediate wall portion 14c of the annular wall 14 may be approximately 0.365 inch. The opposite ends 14a and 14b of the annular wall 14 taper outwardly such that the radial thickness of wall 14 at the opposite end surfaces 12a and 12b is approximately 0.390 inch. This results in substantial material savings in comparison to a similar size stator frame made in accordance with prior sand casting techniques wherein the annular wall of the cast stator frame or housing had a nominal radial thickness of approximately 0.625 inch throughout its length before machining the bore to accommodate a stator core.

The stator frame housing 12 has a plurality of external longitudinally extending cooling fins 24 formed integral with the annular wall 14. In the illustrated embodiment, and referring particularly to FIG. 5, the cooling fins 24 are formed about the annular wall 14 so that a plurality of substantially equally spaced cooling fins extend outwardly from each of four generally equal arcuate segments or quadrants of the annular wall. For example, an upper quadrant of the annular wall 14 is defined as the arcuate portion of wall 14 between a pair of mutually perpendicular planes, indicated by phantom lines 26a and 26b, which intersect at the center axis 20 of the longitudinal bore 16 and form included 45° angles with a vertical plane containing the center axis 20. In similar fashion, a lower arcuate quadrant of wall 14 is defined between the intersection of planes 26a and 26b with the lower portion of the annular wall 14. Similarly, the planes 26a and 26b establish opposite side quadrants of the annular wall 14 which extend between the upper and lower quadrants.

Figure 5:
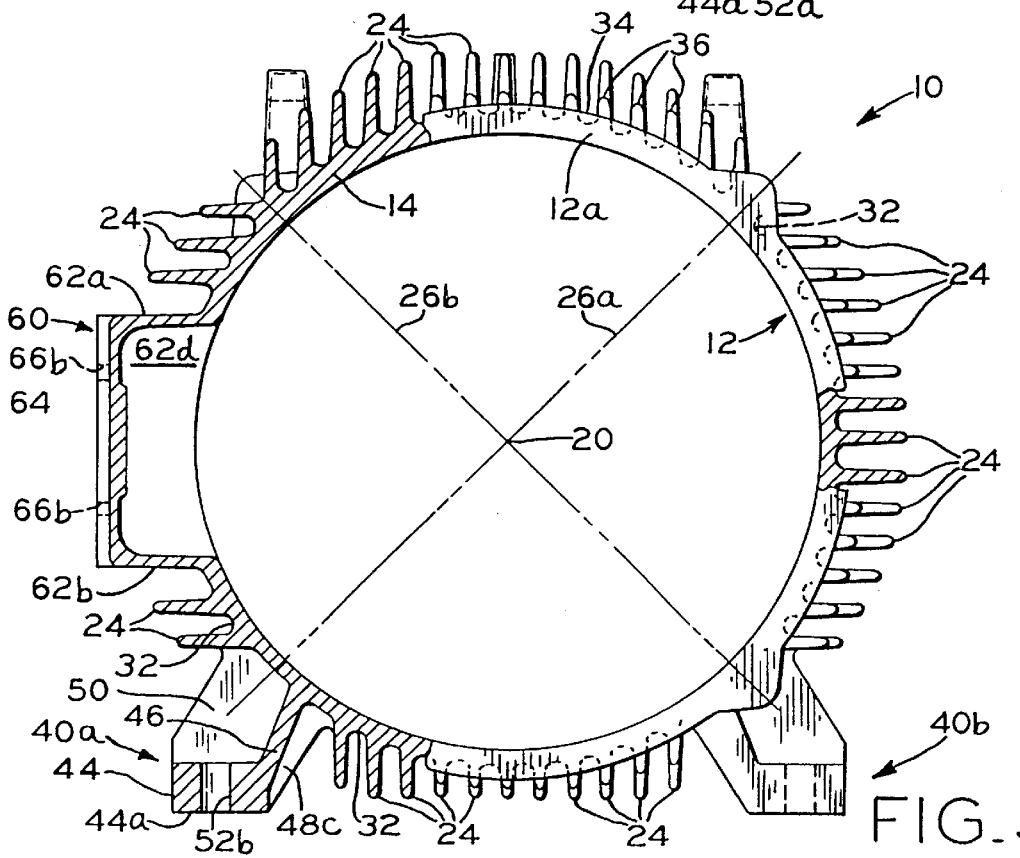
FIG. 5 is a partial end elevational view and partial transverse sectional view taken substantially along line 5—5 of FIG. 4.

As illustrated in FIG. 5, the cooling fins 24 formed integral with the upper quadrant of the annular wall 14 extend vertically upwardly. The cooling fins 24 formed integral with the bottom or lower quadrant of annular wall 14 extend vertically downwardly. The longitudinal cooling fins 24 formed integral with the opposite side quadrants of annular wall 14 extend outwardly in substantially horizontal planes.

Substantially all of the cooling fins 24 of stator frame 10, except the cooling fins extending downwardly from the center portion of the lower quadrant of annular wall 14, are of generally equal height. For purposes of description, the term "height" refers to the distance the respective cooling fins extend outwardly from the outer surface of the intermediate length portion 14c of the annular wall 14, where the outer diameter of the intermediate length wall portion 14c is measured at the base of generally equal radius fillets formed between and at the base of adjacent pairs of cooling fins, such as indicated at 32 in FIG. 5. With the cooling fins 24 having substantially equal height, particularly along the upper and opposite side quadrants of the annular wall 14, the outer longitudinal edges of the equal height fins lie generally near to a circle concentric with the bore axis 20. The cooling fins 24 on the lower quadrant of the annular wall 14 are made somewhat shorter adjacent the central portion of the lower quadrant so that the outer longitudinal edges of the lower cooling fins are spaced above a plane containing the bottom coplanar surfaces of mounting foot pads cast integral with the wall 14, as will be described.

In accordance with one feature of dynamoelectric machines and stator housings that embody aspects of the present invention, the cooling fins 24 have an effective cooling fin height to stator housing diameter ratio of at least 4.0, and preferably approximately 4.8. The effective cooling fin height to diameter ratio is defined as the ratio of the sum of the heights of all of the cooling fins 24 over the outer diameter of the annular wall 14 at the longitudinal center of the stator frame. If desired, this ratio can be increased to approximately 6.0. This ratio is significantly higher than the effective cooling fin height to diameter ratio obtained with prior sand cast stator housings or frames of similar axial bore size. With the cooling fins 24 in the described embodiment having heights of approximately 1.69 inch and mean thickness of approximately 0.206 inch, and with the cooling fins on both the stator housing 12 and prior sand cast stator frames of comparable bore size being spaced apart a nominal distance of approximately 0.75 inch, the increased ratio of effective cooling fin height to diameter for stator housing 12 results in an increase in cooling or heat transfer surface area of approximately 20–25 percent over prior sand cast stator housings of the same nominal axial bore size. The increased heat transfer surface area due to an increased effective ratio of cooling fin height to diameter ratio for stator housing 12 has resulted in an increased cooling or heat dissipation rate (watts/° C.) of approximately 4–8 percent, as tested per IEEE 112 B.

Referring to FIG. 4, the longitudinal cooling fins 24 extend along substantially the full longitudinal length of the annular wall 14 of the stator housing 12. Preferably, a slightly increased diameter or radial flange is formed at each end of the annular wall 14, such as indicated at 34a and 34b. The flanges 34a and 34b are each comprised of four arcuate segments which extend about the aforedescribed corresponding upper, lower and opposite side quadrants of the annular wall 14. The cooling fins 24 extend longitudinally between the end flanges 34a and 34b. The opposite ends of each cooling fin 24 are recessed, such as indicated at 36 in FIG. 4, to accommodate and pilot a generally annular edge of a cooling fan shroud or shell (not shown) when mounted on a completed fan-cooled motor employing the stator housing 12. By providing substantially similar recessed surfaces 36 on opposite ends of each of the cooling fins, the cooling fan shroud and associated fan blade assembly may be mounted at either end of the stator housing 12.

The increased height longitudinal cooling fins 24 formed on the stator housing 12 enable the annular wall 14 to have a thinner radial thickness along substantially its full length then has heretofore been obtainable with similar size stator housings having similar horsepower ratings and made by prior sand casting processes. By forming the increased height cooling fins integral with the annular wall 14, the cooling fins add rigidity to the thinner annular wall throughout substantially its full length so that the overall rigidity and strength of the resulting housing 12 is equal to or greater than prior sand cast stator housings or frames having substantially the same nominal size stator core cavities or bores and horsepower rating. A ratio of effective cooling fin height to annular wall thickness of at least approximately 200, and in the range of approximately 200–350, is advantageous for a stator housing having the aforementioned fin size and wall thickness and an axial stator core bore of approximately fifteen inches diameter. The effective ratio of cooling fin height to annular wall thickness is defined as the ratio of the sum of the heights of all of the fins 24 to the radial thickness of the annular wall 14 at the longitudinal center of the stator housing 12. The thinner radial thickness of annular wall 14 enabled by the greater height cooling fins 24 also increases the cooling rate through the annular wall as compared to thicker annular walls that would be required for comparable size stator housings made in accordance with prior sand casting processes. In the illustrated and described embodiment, the stator frame or housing 12 is representative of stator housings which are believed to be particularly well suited for stator housings or frames categorized as NEMA size 320 up to 449.

The stator housing or frame 12 has four mounting foot pads 40a, 40b, 42a and 42b formed integral with the annular wall 14 in pairs adjacent opposite ends of the housing. The pairs of mounting foot pads 40a,b and 42a,b are substantially identical in configuration so that only the mounting foot pad 40a will be described in detail. Referring to FIGS. 4–7, the mounting foot pad 40a includes a generally rectangular pad 44 having a lower or bottom planar surface 44a which is coplanar with the corresponding bottom surfaces on the other mounting foot pads 40b and 42a,b. The mounting pad 44 is formed integral with the annular wall 14 through a support web 46 which forms an included angle of approximately 20° with a plane perpendicular to the bottom surface 44a and parallel to the longitudinal bore axis 20 of the housing 12.

A feature of the stator housing 12 lies in making the connecting web 46 of substantially equal thickness to the radial thickness of the annular wall 14. This is particularly desirable in lost foam casting where substantially equal wall thickness for various portions of the casting is desired. By making the connecting web 46 of generally equal thickness to the annular wall 14, and with the wall 14 being thinner than prior sand cast stator frames of similar size, the support strength of the associated mounting pad 44 would be slightly reduced over prior similar size sand cast stator housings where the thickness of the connecting webs integrally connecting the mounting foot pads to the corresponding annular stator walls is generally greater than the annular stator wall thickness. To overcome the reduced strength of the thinner connecting web 46, a plurality of reinforcing ribs, such as indicated at 48a–d in FIG. 7 and at 50 in FIG. 5, integrally interconnect the mounting foot pad 44 to the web 46 and to the annular wall 14. The reinforcing ribs 48a–d lie in parallel spaced planes perpendicular to the web 46 and extend off the backside of web 46 between the mounting pad 44 and the annular wall 14. The web 50 is a single web substantially perpendicular to web 46 and disposed at one end of the mounting pad 44 so as to enable access to two mounting bolt holes 52a and 52b formed in the mounting pad 44.

The mounting foot pads 40a,b and 42a,b have their lower or bottom planar surfaces, such as indicated at 44a, lying in a common plane perpendicular to a vertical plane containing the center axis 20 of the annular wall 14. Depending upon the particular envelope limitations on the stator housing in its finalized motor or generator assembly application, the downwardly extending cooling fins 24 on the lower arcuate quadrant of the annular housing 14 may be of substantially identical height. Alternatively, the downwardly extending longitudinal cooling fins 24 generally adjacent the center of the lower quadrant of the annular wall 14 may be made of a shorter height such that none of the downwardly extending cooling fins extend below the plane of the coplanar bottom mounting surfaces on the mounting foot pads 40a,b and 42a,b.

As briefly described, the stator housing or frame 12 is made by a lost foam casting process which enables precise manufacture of the housing 12 in cast iron or aluminum. A feature of making the stator housing 12 by the lost foam method is that the finished stator housing is substantially similar in appearance when made of either aluminum or cast iron. The lost foam process is generally known and includes the various aforedescribed process steps. A significant advantage that can be obtained from using a lost foam process as compared to prior sand casting processes for manufacturing stator housings is significant cost savings which may be realized through substantially reduced material waste and through reduced machining requirements. The applicant has determined that the precise tolerance limits obtainable with the lost foam process can lead to greatly reduced machining requirements and thus substantially reduced labor costs associated with producing a finished stator housing or frame. Of significant importance is the fact that a lost foam process facilitates manufacture of the stator housing 12 with a thinner annular wall 14 about the stator core receiving bore than has been obtainable with prior sand cast stator housings of comparable size and horsepower rating. The thinner wall, coupled with the ability to provide longitudinal cooling fins which establish a greater ratio of effective cooling fin height to annular wall outer diameter, and a greater ratio of effective cooling fin height to annular wall thickness than heretofore obtained with sand cast stator housings or frames, results in a lighter weight stator housing having substantially equal or improved strength and rigidity over stator housings made in accordance with prior sand casting processes.

It is emphasized that synergy between the cooling fins 24 and stator housing annular wall 14 permits the use of fins of greater height (i.e., generally radial length) and a thinner annular wall which results in a reduction in the total amount of raw material used. Thus, were it not for the structural reinforcement provided by the fins, a thicker annular wall would be required for strength purposes. However, adding a small amount of material to make the fins of greater height or outward length permits an even greater reduction in material in the annular wall, and the thinner annular wall and greater height fins both contribute to improved thermal performance (as well as reduced total material consumption).

Figure 3:
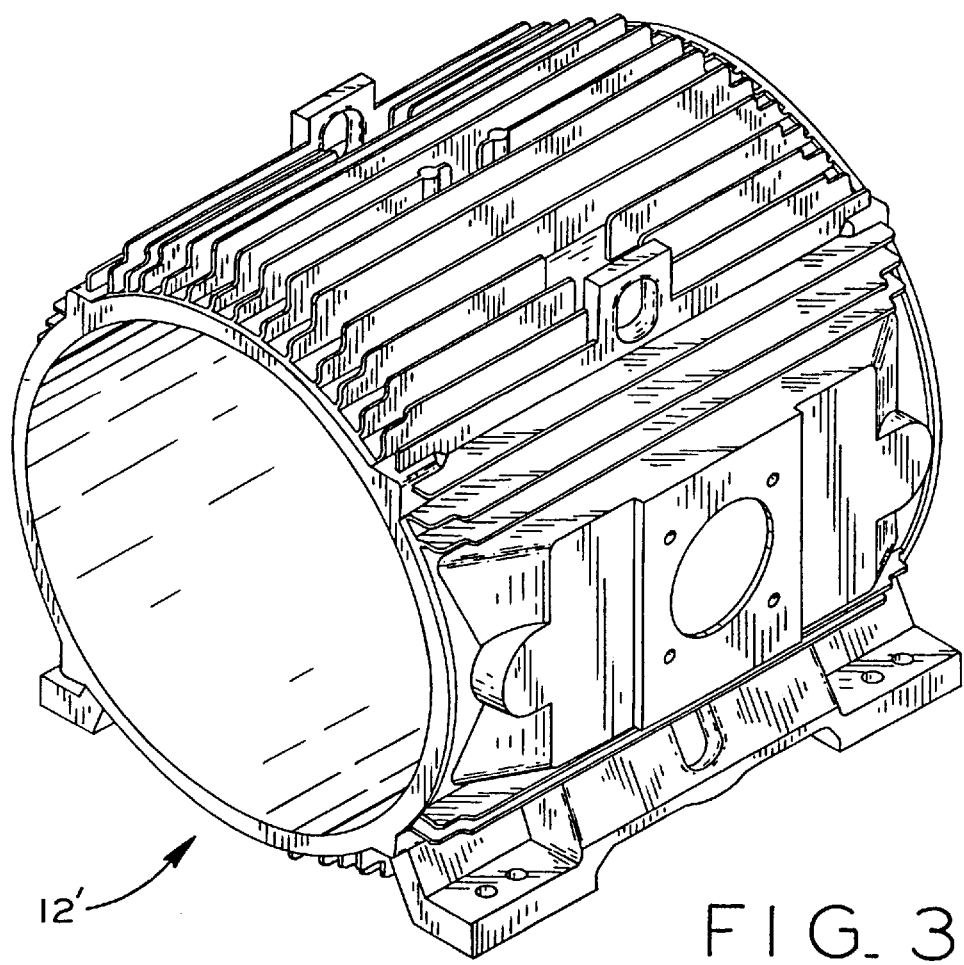
FIG. 3 is a perspective view of a vaporizable pattern as employed in the lost foam casting process for making the stator housing illustrated in FIGS. 1 and 2.

FIG. 3 illustrates a pattern, indicated at 12', made of a vaporizable polymeric material, such as fused small polystyrene plastic beads having a non-vaporizable but gas permeable coating. The pattern 12' is an integral single piece pattern which contains no parting lines or parting planes as in prior known patterns for making motor stator housings or frames. A significant benefit of the unitary single-piece pattern 12' is that it duplicates the aforedescribed stator housing 12 in substantially identical dimensional configuration so that the resulting casting requires minimal machining while obtaining the aforedescribed radial wall thickness and higher effective cooling fin height to diameter and annular wall thickness ratios. This increases the heat transfer surface area for cooling purposes and adds rigidity to the thinner annular wall 14 of the stator frame housing 12. The lost foam process may be used for various size stator housings or frames, but, as noted, finds particular beneficial application with NEMA 320 up to 449 size frames. The lost foam process also significantly reduces the time involved from start-to-finish in making the stator housings or frames over prior sand casting processes.

The integral single-piece pattern 12' is configured to form an integral conduit box mounting or support pad on the stator housing 12, as indicated at 60 in FIGS. 4–6. The conduit box mounting pad 60 has peripheral horizontal and vertical support walls 62a–d which are integral with the annular wall 14 of the stator frame housing 12 so that an internal cavity 64 within the conduit box mounting pad is in open communication with the axial bore 16. The cavity 64 is bounded on its outer surface by a generally vertically disposed wall 66 having a circular opening 66a to facilitate entry of electrical conductors internally of the mounting pad 60 for connection to internal windings of a stator core. The wall 66 also has four holes 66b spaced about the circular opening 66 to facilitate attachment of a connector plate or conduit box or the like.

By making the stator housing or frame 12 by the lost foam process, the peripheral walls of the conduit box mounting pad 60 may be made thinner than previously obtainable with conduit box support or mounting pads on sand cast stator housings or frames, thereby providing greater flexibility with substantially reduced possibility of cracking or other fatigue stress which may result with sand cast stator housings.

The lost foam pattern 12' is also configured to form cast upstanding lift bosses 70a and 70b on the stator housing 12 which extend upwardly from laterally opposite sides of the housing intermediate its length. The lift bosses 70a,b are formed integral with the annular wall 14 and have suitable openings 72a and 72b, respectively, formed therein to receive lift hooks or the like to facilitate lifting and handling of the stator housing 12 as well as a completed dynamoelectric machine 10 such as depicted in FIG. 8.

As aforedescribed, by making the stator housing 12 of the dynamoelectric machine 10 by the lost foam process, the axial bore 16 may be formed with close dimensional tolerances so as to enable assembly with the stator core 18 with minimal machining of the bore 16. Referring to FIG. 6, in the illustrated embodiment the stator core 18 includes a wound core 78 of conventional design. The core 78 has an outer cylindrical surface 78a which facilitates cold-press assembly into the close tolerance bore 16 so as to maximize heat transfer from the stator core to the stator housing 12. A rotor 80 is rotatably supported within an axial bore 78b in the wound core 78 by a rotor shaft 82 which in turn is rotatably supported within suitable bearings (not shown) carried by the end frames or shields 20a and 20b (FIG. 8) as is known.

While a preferred embodiment of a dynamoelectric machine employing a stator housing or frame in accordance with the present invention, and the lost foam process for making the stator housing, have been illustrated and described, it will be understood that changes and modifications may be made therein without departing from the invention in its broader aspects. Various features of the invention are defined in the following claims.

What is claimed is:

1. A stator frame for use in a dynamoelectric machine, said stator frame comprising an integral one-piece cast housing having a generally annular wall of a predetermined outer diameter and defining opposite ends having end surfaces lying in planes generally transverse to the longitudinal axis of said annular wall, said housing having a generally cylindrical axial bore intersecting said opposite ends and adapted to receive a stator core, and a plurality of external longitudinally extending cooling fins spaced about said annular wall and formed integral therewith, said cooling fins being configured to collectively establish a ratio of effective cooling fin height to said annular wall outer diameter of at least 4.0 at approximately the longitudinal center of said frame.

2. A stator frame as defined in claim 1 wherein said cooling fins extend generally horizontally outwardly from opposite arcuate side quadrants of the annular wall, and extend generally vertically from upper and lower arcuate quadrants of the annular wall, all of said cooling fins extending generally horizontally from said side quadrants and extending generally vertically from said upper quadrant being of substantially equal height and thickness.

3. A stator frame as defined in claim 2 wherein said horizontal and vertically extending cooling fins are spaced apart substantially equal distances within their respective quadrants of said annular wall.

4. A stator frame as defined in claim 2 including a plurality of mounting foot pads formed integral with said annular wall in a manner to enable support of the stator frame in a predetermined orientation.

5. A stator frame as defined in claim 1 wherein said annular wall has at least one conduit box mounting pad formed integral with said annular wall so as to extend outwardly therefrom.

6. A stator frame as defined in claim 1 wherein said stator frame is made by a lost foam casting process.

7. A stator frame as defined in claim 6 wherein said stator frame is made from cast iron or aluminum.

8. A stator frame as defined in claim 1 wherein said annular wall has a predetermined radial thickness, said longitudinal cooling fins establishing a ratio of effective cooling fin height to annular wall thickness of at least approximately 200.

9. A stator frame as defined in claim 8 wherein said effective cooling fin height to annular wall thickness ratio is in the range of approximately 200 to 350 for a stator frame having a nominal axial bore diameter of approximately fifteen inches.

10. A stator frame as defined in claim 8 wherein said cooling fins further establish a ratio of effective cooling fin height to annular wall outer diameter of at least approximately 4.0.

11. A stator frame as defined in claim 10 wherein said effective cooling fin height to diameter ratio is approximately about 4.2.

12. A stator frame for use in a dynamoelectric machine, said stator frame including a generally annular wall having opposite ends and defining a generally cylindrical axial bore intersecting said opposite ends and adapted to receive a stator core, said annular wall having greater radial thickness adjacent said opposite ends than the radial thickness of said annular wall intermediate said opposite ends, and including a plurality of longitudinal cooling fins formed externally longitudinally along and integral with said annular wall so as to extend substantially the full longitudinal length of said annular wall, said cooling fins having greater height along said intermediate longitudinal length of said wall than at said increased thickness ends of said wall such that the rigidity of the intermediate length of said annular wall is substantially enhanced by the rigidity of fins tied to the increased thickness opposite ends of said annular wall.

13. A stator frame as defined in claim 12 wherein said stator frame is formed by a lost foam casting process.

14. A stator frame as defined in claim 12 wherein said longitudinal cooling fins establish a ratio of effective cooling fin height to annular wall outer diameter of at least about 4.0.

15. A stator frame as defined in claim 14 wherein said cooling fins have an effective cooling fin height to diameter ratio in the range of approximately 4.0 to 6 along the portions of said fins adjacent said intermediate length of said annular wall.

16. A stator frame as defined in claim 13 wherein said lost foam casting process forms said axial bore to receive a stator core in a press-fit relation with minimal machining of said bore.

17. A stator frame as defined in claim 12 wherein said reduced thickness intermediate wall portion is uniform between said increased thickness opposite ends of said annular wall.

18. A stator frame as defined in claim 17 wherein said opposite ends of said annular wall are defined by outwardly tapered external surfaces.

19. A stator frame for a dynamoelectric machine, said stator frame being made by a lost foam process using an integral single-piece vaporizable pattern operative to produce a stator frame housing having a generally annular wall defining an axial bore and having opposite ends lying in planes normal to the axis of said bore, a plurality of external cooling fins formed integral with and extending longitudinally of said annular wall, and a plurality of mounting foot pads formed integral with said annular wall and defining coplanar bottom surfaces enabling the stator frame to be supported on a support surface in a predetermined orientation, said mounting foot pads each being integrally interconnected to said annular wall through a connecting web extending between the corresponding foot pad and said annular wall and lying in a plane inclined to the bottom surface of the corresponding foot pad, and reinforcing ribs formed integral with and perpendicular to each of said connecting webs and the associated mounting foot pad, whereby said reinforcing ribs enable said connecting webs to be made relatively thin without diminishing the support strength of said mounting foot pads.

20. A stator frame as defined in claim 19 wherein said reinforcing ribs extend outwardly from opposite sides of their corresponding connecting webs in normal relation thereto.

21. A stator frame as defined in claim 20 wherein each of said connecting webs has a plurality of generally parallel spaced reinforcing ribs formed integral therewith.

22. A stator frame as defined in claim 21 including four of said mounting foot pads integrally interconnected to said annular wall in pairs adjacent said opposite ends of said annular wall.

23. A dynamoelectric machine comprising in combination, a stator housing having a generally annular wall defining opposite ends and a longitudinal cavity, a stator core within said longitudinal cavity, a pair of end frames secured to the opposite ends of the stator housing, and a rotor rotatably supported by said end frames and extending coaxially through said stator core, said stator housing having a plurality of cooling fins formed integral with and extending longitudinally along the exterior of said annular wall, said cooling fins and annular wall being configured to establish a ratio of effective cooling fin height to annular wall outer diameter of at least 4.0 considered at substantially the longitudinal center of said stator housing.

24. A dynamoelectric machine as defined in claim 23 wherein said ratio of effective cooling fin height to annular wall outer diameter is in the range of approximately 4.0 to 6.0 along at least the intermediate lengths of said cooling fins.

25. A dynamoelectric machine as defined in claim 23 wherein said ratio of effective cooling fin height to annular wall outer diameter is approximately 4.8.

26. A dynamoelectric machine as defined in claim 23 wherein said stator housing is made of cast metal by a lost foam process.

27. A dynamoelectric machine as defined in claim 26 wherein said stator housing is made by a lost foam process using an integral unitary vaporizable pattern.

28. A dynamoelectric machine as defined in claim 23 wherein said cooling fins extend along substantially the full longitudinal length of said stator housing.

29. A dynamoelectric machine as defined in claim 28 wherein said cooling fins and said annular wall are configured to establish a ratio of effective cooling fin height to annular wall thickness of at least about 200.

30. A dynamoelectric machine as defined in claim 29 wherein said ratio of effective cooling fin height to annular wall thickness is in the range of approximately 200 to 350 for a stator housing having a nominal axial bore diameter of approximately fifteen inches.

* * * * *